United States Patent

[11] 3,584,285

| [72] | Inventors | Jerome Goodkin<br>Trenton;<br>George Abbe Dalin, Union, both of, N.J. |
|---|---|---|
| [21] | Appl. No. | 882,370 |
| [22] | Filed | Dec. 15, 1969 |
| [45] | Patented | June 8, 1971 |
| [73] | Assignee | Yardney Internation Corporation<br>New York, N.Y.<br>Continuation of application Ser. No.<br>651,243, July 5, 1967, now abandoned. |

[54] SYSTEM FOR CHARGING ELECTRIC BATTERY CELL
3 Claims, 3 Drawing Figs.

[52] U.S. Cl. ................................................... 320/46,
320/40
[51] Int. Cl. .................................................. H02j 7/12
[50] Field of Search ....................................... 320/46,
DIG. 2, 27, 37, 40, 48

[56] References Cited
UNITED STATES PATENTS
3,477,009  11/1969  Nichols ........................ 370/39

*Primary Examiner*—J. D. Miller
*Assistant Examiner*—John M. Gunther
*Attorneys*—Karl F. Ross and Herbert Dubno

ABSTRACT: There is disclosed a method of controlling the charge applied to a battery to minimize gas formation. Each of the battery cells includes an auxiliary electrode. Charging current is applied to the battery while the recombination current flowing in the auxiliary electrode circuit is detected. The charging current is interrupted when the recombination current in any one of the cells reaches a preselected upper limit and is reinstated when the recombination currents in all of the cells reach a preselected lower level. The interruption and resumption of charge current is repeated until the battery reaches a desired charge level.

CHARGE AT POSITIVE PRESSURE

RECOMBINATION CURRENT — — — — —
PRESSURE — · — · — · —
CELL VOLTAGE —————

CHARGE AT NEGATIVE PRESSURE

INVENTOR.
JEROME GOODKIN
GEORGE A. DALIN
BY
Bernard Malina
ATTORNEY

SYSTEM FOR CHARGING ELECTRIC BATTERY CELL

The invention herein is streamline continuation of copending U.S. application Ser. No. 651,243, filed July 5, 1967, and now abandoned.

BACKGROUND OF THE INVENTION

The present invention is directed to a method of automatically controlling the amount of charge applied to a battery and more particularly to charge control for negative, i.e. subatmospheric, cell pressures, and to apparatus therefor.

Most batteries, particularly those utilized in space satellites, are required to operate in a sealed condition in order to protect the system components and to obtain extended life. However, it has been found to be quite difficult to construct a successful seal, and accordingly, in order to eliminate the problems encountered with gas formation, it is necessary either to prevent such gas formation or to eliminate the gas formed during overcharge or overdischarge.

Presently known methods for overcoming the problems of gas formation include the use of an auxiliary fuel-cell electrode whereby the current developed in the auxiliary electrode circuit in the presence of oxygen is used to activate a relay to discontinue further charging or reduce it to a trickle rate. This technique, which has been used with nickel-cadmium batteries, is based on the generation of oxygen during the latter stages of charge and after the battery is essentially charged. Thus, the aforementioned known method which effectively senses the state of charge only in the positive pressure region does not prevent the formation of relatively high internal cell pressures, e.g. up to 4 atmospheres above ambient. This necessitates the use of metal cell cases to withstand the pressure resulting in an undesirable increase in overall battery weight. Moreover, on operating in the positive pressure region pursuant to the aforementioned method, the use of the recombination current in the auxiliary electrode to completely remove the oxygen generated on overcharge has been found to require an unduly long time.

Furthermore, when charging a series of cells in accordance with the above-mentioned conventional overcharge-cutoff method, cell imbalance occurs on account of variations between the several cells in the battery. As a result the battery may be taken off charge before all cells are fully charged.

It has been found that for high-rate charging, i.e., 4 to 5 times the ampere-hour rate, best results have been obtained when the battery is shut down after introduction of about 70 percent to 80 percent of full charge and then charged at constant voltage at intervals ranging from 5 to 15 minutes. Accordingly, in order to facilitate intermittent constant-voltage charging, it is necessary to signal the lower level condition of charge, i.e., the state when charging may be reinitiated, as well as the upper limit of charge, i.e., cutoff conditions. It has been found that the best method to control such intermittent charging is to detect the high and low recombination-current levels, which requires that only very small quantities of gas be evolved before charge shutdown, so that recombination can occur relatively quickly. Such operation evidently is impossible at pressures above ambient, which is characteristic of the conventional positive-pressure techniques as described above with respect to nickel-cadmium cells. This is particularly true with respect to silver-cadmium cells, where the gas pressure should not rise above approximately 10 p.s.i.g. since, in the interest of weight conservation, lightweight plastic cell cases are used.

It is therefore an object of the present invention to provide a method of battery-charge control which automatically signals high and low charge conditions.

It is a further object of the present invention to provide a high-level and low-level battery-charge control operative at negative cell pressures.

Another object of the present invention is to provide a method in accordance with the aforementioned objects whereby cell balance is achieved when charging a series of battery cells.

Another object of the present invention is to provide a method of charging which avoids generation of high pressures which would require the use of heavy metal encasement.

SUMMARY OF THE INVENTION

Generally speaking and in accordance with the principles of the present invention, the method comprises the steps of applying charging current to the battery and detecting the gas pressure of each cell in the battery. The application of charging current is interrupted when the cell pressure in any one of the battery cells reaches a preselected upper limit, and is reinstated when all of the cell pressures reach a preselected lower limit. The interruption and resumption of the charge current is repeated until the battery reaches a desired charge level.

The features of the invention which are believed to be novel are set forth with particularity in the appended claims. The invention itself, however, both as to its organization and its method of operation, together with further objects and features thereof may best be understood by reference to the following description taken in conjunction with the accompanying drawing wherein:

DESCRIPTION OF PREFERRED EMBODIMENT

Figure 1:
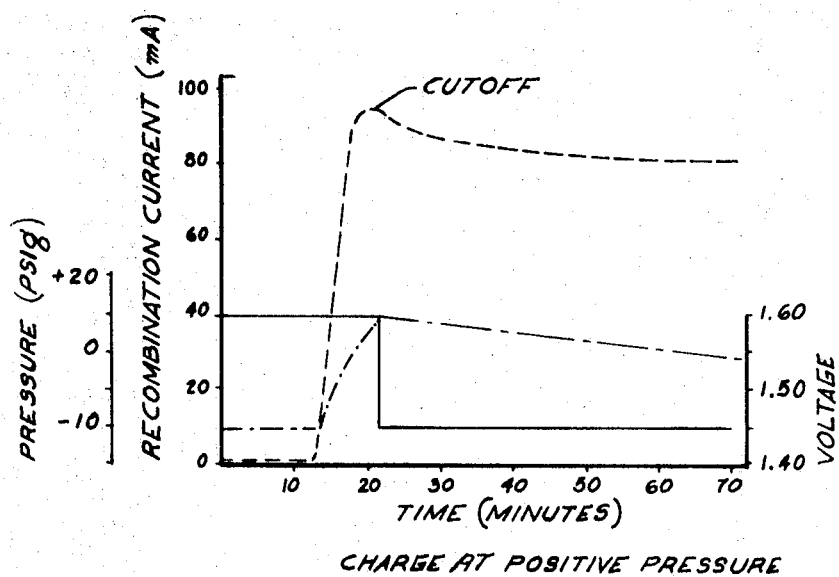
FIG. 1 is a graphical representation depicting the results obtained when using the prior-art method of controlling the charge applied to a silver-cadmium cell.

In FIG. 1 there are shown the results obtained when utilizing the prior-art technique of detecting an auxiliary-electrode recombination current under positive pressure for controlling the charging of silver-cadmium battery cells. It is seen that as the cells are charged, the gas pressure and the recombination current are relatively constant for about 15 minutes until the upper charge-cutoff level is reached, whereupon the gas pressure rises relatively rapidly to approximately 15 p.s.i.g. and the recombination current rises sharply to its cutoff value of e.g. 100 mA. However, after the cutoff value has been reached, the recombination current in the auxiliary electrode circuit is seen to remain substantially constant with the cell pressure decreasing very slowly. Accordingly, the use of the auxiliary-electrode-recombination-current-sensing technique in the positive-pressure region precludes intermittent high-rate charging which, as pointed out above, is a preferred method of charging.

Furthermore, when charging a series of cells by the above known method, if a particular cell is utilized as a pilot cell to initiate cutoff of charging current, cell imbalance will generally result from variations between cells in the battery.

Figure 2:
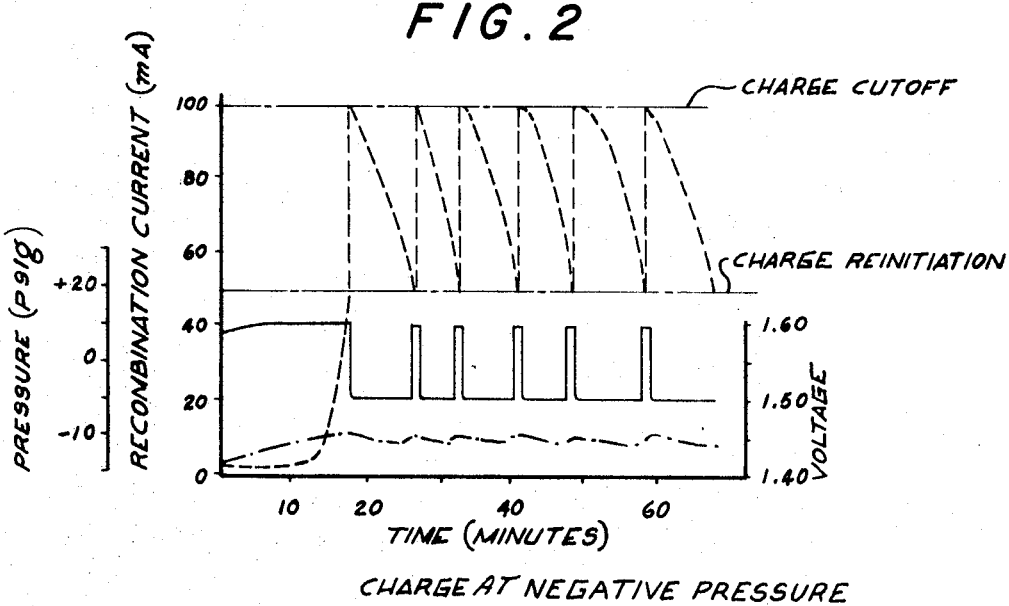
FIG. 2 is a graphical representation depicting the results obtained when using the method of our present invention for controlling the charge applied to a silver-cadmium cell.

In FIG. 2 there are shown the results obtained when charging, in accordance with this invention, silver-cadmium battery cells similar to those utilized in the tests depicted in FIG. 1. As shown in FIG. 2, with the battery under charge at a constant level of about 1.60 volts, there was a slight rise in gas pressure, accompanied by the recombination current which remained negligibly low for a period of approximately 15 minutes. Thereafter, the recombination current in the auxiliary electrode circuit rose sharply to the level of 100 mA at which point the application of charging current to the battery was cut off as hereinafter described with respect to the apparatus of FIG. 3.

After the cutoff there was a slight decrease in cell pressure and the recombination current decreased, until a current level of 50 mA was reached, at which point the application of constant-potential charge to the battery was resumed as hereinafter described. The recombination current thereafter rose sharply in the same manner as in the first cycle of recombination current until the upper cutoff level of 100 mA recombination current was reached, thereby initiating cutoff. Again, subsequent to charge cutoff, the recombination current decreased to its lower cutoff value of 50 mA, and initiated constant-voltage-charge resumption. In this manner, intermittent high rate charging, i.e., 4 to 5 times the ampere-hour rate, was obtained along with its attendant advantages.

In the tests depicted by FIGS. 1 and 2 a silver-cadmium battery was utilized having an auxiliary electrode containing platinum. Measurements made on electrodes containing between 2.5 and 8.0 mg. of platinum/cm.² have shown that a minimum of 5 mg./cm.² of platinum is necessary if the auxiliary electrode is to respond to pressures over the range of −5 to −10 p.s.i. It is believed that higher concentrations may be needed for extended use, in view of the fact that some poisoning generally occurs within the cell environment.

Figure 3:
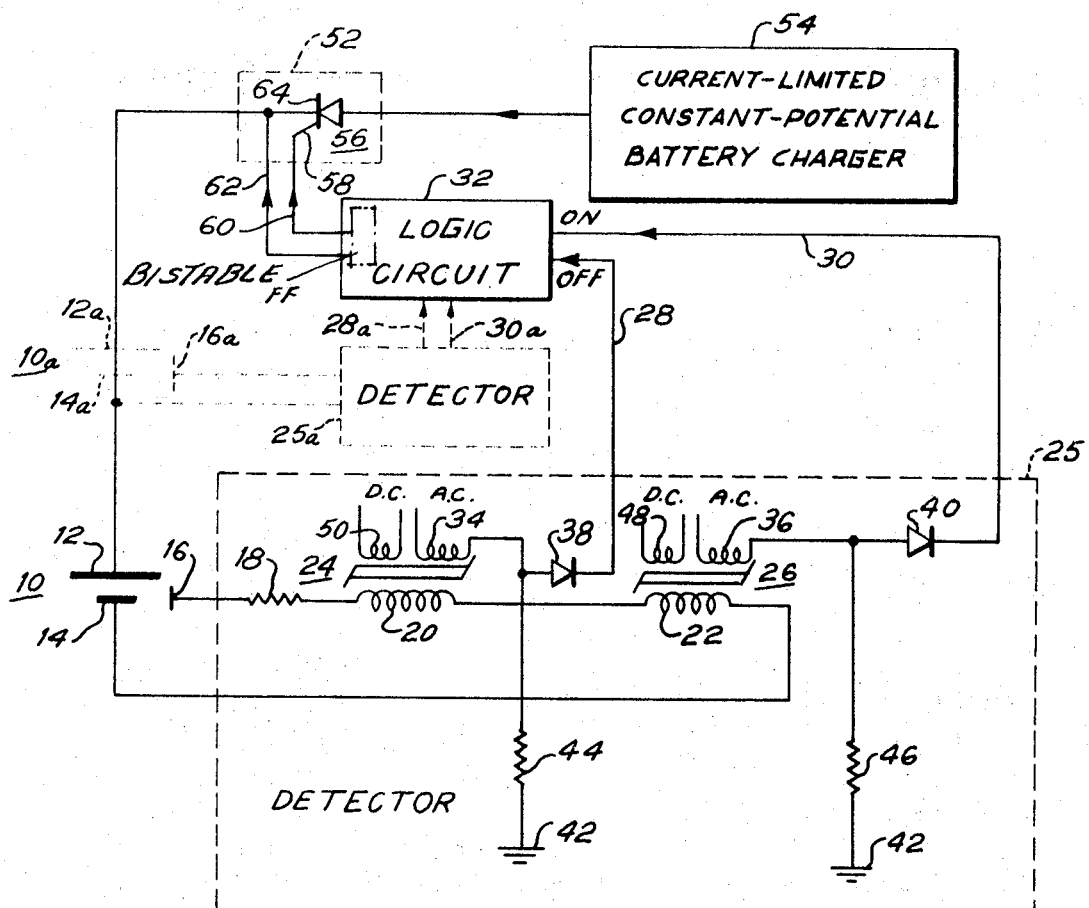
FIG. 3 is a partial schematic and partial block diagram depicting a preferred embodiment of the apparatus of the present invention.

In FIG. 3 there is shown a preferred embodiment of a charge-control apparatus constructed in accordance with the principles of the present invention, whereby the particular charging characteristics shown in FIG. 2 are achieved.

In the example depicted by FIGS. 2 and 3, the battery 10 under charge comprised a silver positive electrode 12, a cadmium negative electrode 14 and a platinum auxiliary electrode 16. Generally, the potential of the couple formed by each oxygen-recombination electrode 16 with the cadmium plate 14 is developed across a resistor to provide a preselected ohmic load, which in the particular example depicted in FIG. 2 was 5 ohms. In this connection it is noted that in the example depicted in FIG. 1, a 10-ohm offset resistor 18 was utilized in order to achieve higher cell pressures. The offset resistor 18 is serially connected to first and second coils 20 and 22 which constitute the primary winding of saturable-core transformers 24 and 26, respectively.

Saturable core transformers 26 and 24 are operative to saturate at levels of 50 mA and 100 mA respectively, to provide output signals at their respective output leads 28 and 30 to a binary logic circuit 32. Secondary windings 34 and 36 of transformers 24 and 26, respectively, are connected to output leads 28 and 30 through diodes 38 and 40, respectively, and to ground terminals 42 and 44 through resistors 44 and 46, respectively.

Transformers 24 and 26 are so biased by DC windings 50 and 48 that a signal will appear in AC leg 36 only when a current of at least 50 mA is caused to flow in winding 22, and a signal will appear in AC leg 34 only when a current of at least 100 mA is caused to flow through winding 20. It is understood that the method of the present invention and the circuit arrangement shown in FIG. 3 may be employed for charging a single cell or a series of cells 10, 10a, etc. by connecting the auxiliary and negative electrodes of each cell under charge to a respective detector 25, 25a, etc. each similar to that shown schematically and described above with respect to cell 10. In the case of multiple-cell charging, the respective detector output leads 28, 28a and 30, 30a are connected to an OR gate in logic circuit 32. Logic circuit 32 may suitably comprise a bistable flip-flop FF, leads 28, 28a and 30, 30a being connected to the OR circuit whose output is connected to the bases of associated switching transistors not shown. The output of logic circuit 32 is applied to a controlled switch 52 which is operative to selectively connect and disconnect the output of battery charger 54 to and from cells 10, 10a under charge, in accordance with the state of the bistable flip-flop of logic circuit 32. In the embodiment of FIG. 3, controlled switch 52 comprises a gate-controlled rectifier 56 serially connected between battery charger 54 and the cells under charge. Logic-circuit output lead 60, which provides the output signal for closing switch 52 to apply the output of battery charger 54 to the cells 10, 10a under charge, is connected to gate 58 to thereby turn on the controlled rectifier 56. Logic-circuit output lead 62 is connected to cathode 64 to apply a reverse voltage thereto to deactivate the controlled rectifier 56, thus interrupting the supply of current to the cells under charge.

Initially, at the commencement of charge, the bistable flip-flop FF in logic circuit 32 is set to the "on" condition. Until the recombination current in any cell rises to 50 mA, transformer 26 will transmit a "seton" signal (deenergization of lead 30) to the bistable flip-flop FF. The flip-flop, once set, will remain in the same state. When the auxiliary-electrode recombination current rises to the cutoff level of 100 mA, transformer 24 will apply a "setoff" signal (energization of lead 28) to the flip-flop circuit, thereby producing a cutoff signal at output lead 62, which renders controlled rectifier 56 nonconductive. When the auxiliary recombination currents from all the cells of the battery drop below 50 mA, transformer 26 provides a "seton" signal to logic circuit 32 via lead 30 which in turn applies a turn-on signal to gate 58 via output lead 60.

It is understood that detector 25 is not limited to the use of two saturable-core transformers for the detecting of the upper and lower current levels. A single core transformer with multiple windings will serve as well. Furthermore, it is understood that a suitable scanning technique may be utilized as an alternate method to the simultaneous sensing technique of detector 25 employing the logic circuitry of circuit 32, without departing from the scope of the present invention.

Thus, when any one of the cells under charge reaches the charge-cutoff limit, i.e., the recombination current reaches 100 mA, logic circuit 32 will provide a cutoff signal at its output lead 62, which may suitably comprise a reverse voltage applied to cathode 64 and which is operative to render controlled rectifier 56 nonconductive, and hence cutoff the supply of charging current from charger 54 to all the cells 10, 10a under charge. After cutoff the recombination current in the cells 10, 10a under charge will decrease, as described above with respect to FIG. 2, until the recombination current of all of the cells reaches the lower limit of 50 mA, whereupon its corresponding detector 25 causes logic circuit 32 to produce a reinsertion signal at its output lead 60, which is applied to gate electrode 58 to thereby turn the controlled rectifier 56 on, i.e., resume charge by reconnecting the output of charger 54 to cells 10, 10a under charge.

In the next recombination-current cycle, as charge is applied, the charge level of all the cells under charge will rise closer to the cutoff level until the recombination current of one of the cells reaches the 100-mA cutoff level, thereby interrupting the application of charge to all the cells under charge. Again, charge to all the cells will be resumed when all of the cells reach the lower current level of 50 mA to cause resumption of charge as explained above. In this way, all the cells under charge will eventually reach the full-charge level, corresponding to a recombination current of 100 mA, after a suitable number of charging cycles. An important feature of the present invention is thus demonstrated in that all charge balance is automatically achieved among the several cells under charge. Additionally, every cell is individually monitored and is thereby protected against excessive pressure rise which could rupture the cell case. Hence lightweight plastic cases may be used, thereby achieving the maximum ratio of stored energy to overall weight.

As, the primary operative force is the cell pressure, it is understood that any suitable device such as a strain gauge, which can measure and signal the pressures within the cells over the range of interest, may be utilized to detect the recombination currents.

We claim:
1. A system for charging an electric battery cell having a pair of main electrodes and an auxiliary electrode for developing a potential difference with reference to one of said main electrodes depending upon the state of charge of the cell, comprising:

a source of charging current connectable across said main electrodes;

switch means in series with said source for interrupting the flow of said current and including a gate-controlled rectifier having an anode-cathode path in series with said source;

detector means connected between said auxiliary electrode and said one of said main electrodes of the cell for sensing the magnitude of a recombination current flowing therebetween, said detector means having a first output carrying a seton signal in response to magnitudes of said recombination current up to a predetermined lower level and a second output carrying a setoff signal in response to magnitudes of said recombination current exceeding a predetermined upper level, said detector means comprising a pair of differently biased saturable-core transformers with output windings respectively connected to said first and second outputs, and serially connected input windings bridging said auxiliary electrode and said one of said main electrodes; and control means connected to said outputs for closing said switch means in response to said seton signal and opening said switch means in response to said setoff signal.

2. A system as defined in claim 1 wherein said control means comprises a logic circuit operative to close said switch means upon deenergization of said first output and to open said switch means upon energization of said second output.

3. A system as defined in claim 2 wherein said logic circuit includes bistable means settable by one and resettable by the other of said signals.